(12) United States Patent
Albrecht (10) Patent No.: US 11,092,161 B2
(45) Date of Patent: Aug. 17, 2021

(54) IMPELLER

(71) Applicant: JAGUAR LAND ROVER LIMITED, Warwickshire (GB)

(72) Inventor: Matthew Albrecht, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 128 days.

(21) Appl. No.: 16/185,345

(22) Filed: Nov. 9, 2018

(65) Prior Publication Data

US 2019/0162199 A1 May 30, 2019

(30) Foreign Application Priority Data

Nov. 24, 2017 (GB) ...................................... 1719510

(51) Int. Cl.
*F04D 29/08* (2006.01)
*F01P 5/10* (2006.01)
(Continued)

(52) U.S. Cl.
CPC .............. *F04D 29/086* (2013.01); *F01P 5/10* (2013.01); *F04D 1/04* (2013.01); *F04D 29/167* (2013.01);
(Continued)

(58) Field of Classification Search
CPC ...... F04D 29/086; F04D 29/061; F04D 29/10; F04D 29/106; F04D 29/122; F04D 29/126; F04D 29/167; F01P 5/10
(Continued)

(56) References Cited

U.S. PATENT DOCUMENTS 2,882,075 A * 4/1959 Biering ................. F04D 29/126
  277/368
3,055,473 A  9/1962 Oldberg et al.
(Continued)

FOREIGN PATENT DOCUMENTS

EP  0417467 A1  3/1991
EP  3214287 A1  9/2017
(Continued)

OTHER PUBLICATIONS

Combined Search and Examination Report under Sections 17 and 18(3) for Application No. GB1719510.8 dated May 24, 2018.
(Continued)

*Primary Examiner* — Woody A Lee, Jr.
*Assistant Examiner* — Maxime M Adjagbe
(74) *Attorney, Agent, or Firm* — Carlson, Gaskey & Olds (57) ABSTRACT

An impeller for use in a pump assembly for a fluid circuit of an engine of a vehicle comprises a plurality of projections provided at radially spaced locations relative to a rotational axis of the impeller, the impeller being rotatable relative to a housing of the pump assembly. The projections extend axially from a surface of the impeller and circumferentially about the rotational axis of the impeller. At least one of the projections is configured to be at least partially received in a recess provided in the housing such that a flow path is provided by the projection and the respective recess, wherein the flow path provides a tortuous flow route for fluid between an inlet and outlet of the pump assembly so as to restrict flow of fluid along said flow path and thereby minimise flow of fluid from the outlet back towards the inlet in a direction opposite to the intended direction of flow.

18 Claims, 10 Drawing Sheets

(51) Int. Cl.
*F16J 15/447* (2006.01)
*F04D 1/04* (2006.01)
*F04D 29/16* (2006.01)
*F04D 29/22* (2006.01)
*F04D 29/42* (2006.01)

(52) U.S. Cl.
CPC ...... *F04D 29/2266* (2013.01); *F16J 15/4476* (2013.01); *F04D 29/426* (2013.01)

(58) Field of Classification Search
USPC .......................................................... 416/182
See application file for complete search history.

(56) References Cited

U.S. PATENT DOCUMENTS

| | | | |
|---|---|---|---|
| 4,213,735 A | 7/1980 | Grennan | |
| 4,594,052 A * | 6/1986 | Niskanen | F04D 7/045 415/121.1 |
| 6,164,655 A * | 12/2000 | Bothien | F16J 15/447 277/303 |
| 6,960,066 B2 * | 11/2005 | Koga | F04D 29/049 417/362 |
| 7,445,213 B1 * | 11/2008 | Pelfrey | F01D 11/02 277/418 |
| 9,650,907 B2 * | 5/2017 | Bricaud | F01D 11/02 |
| 9,765,792 B2 | 9/2017 | Koppler | |
| 2008/0260515 A1 | 10/2008 | Anami et al. | |
| 2014/0308142 A1 * | 10/2014 | Andersson | F16J 15/44 417/423.11 |
| 2015/0345373 A1 | 12/2015 | Knight | |

FOREIGN PATENT DOCUMENTS

| | | |
|---|---|---|
| GB | 2508921 A | 6/2014 |
| WO | 2016051916 A1 | 4/2016 |
| WO | 2016059866 A1 | 4/2016 |

OTHER PUBLICATIONS

Search Report for German Application No. 10 2018 218 697.9 dated Jul. 13, 2020.

* cited by examiner

IMPELLER

CROSS REFERENCE TO RELATED APPLICATION

This application claims priority to United Kingdom Patent Application No. GB 1719510.8 filed on 24 Nov. 2017.

TECHNICAL FIELD

The present disclosure relates to an impeller for use in a pump assembly for a fluid circuit of a vehicle. In particular, the invention relates to an impeller for use in a centrifugal pump assembly. Aspects of the invention relate to an impeller, to a pump assembly for providing engine cooling in a vehicle, and to a vehicle.

BACKGROUND

Centrifugal pumps are used to pump coolant around an internal combustion engine during operation. The pump may be mechanically driven directly by the crankshaft of the engine via a belt and pulley. It is also possible for the pump to be chain-driven, and the pump may be driven by electrical or hydraulic drive. The pump comprises an impeller which pumps fluid from an inlet of a pump housing to an outlet of the pump housing arranged at the circumference or tangent of the impeller. In order to minimise a back-flow of fluid from the outlet of the pump past the impeller towards the inlet of the pump, it is useful to have a seal between the impeller and the pump housing.

It is known to provide recesses in the housing of the pump opposing a front face of the impeller to provide a labyrinth-type seal. However, this design is not ideal as it is not tolerant to axial misalignment. That is to say, radial misalignment between a longitudinal axis of the inlet of the housing and a rotational axis of the impeller affects the sealing properties in a design implementing such a labyrinth cover. This is also true for angular misalignment of these axes. That is to say, when the longitudinal axis of the inlet and the rotational axis of the impeller are not parallel to one another then this also may affect the sealing properties of such a labyrinth cover system.

It is an object of the invention to address at least one of the problems described above.

SUMMARY OF THE INVENTION

In one aspect of the invention there is provided an impeller for use in a pump assembly for a fluid circuit of an engine of a vehicle, the impeller being rotatable relative to a housing of the pump assembly. The impeller comprises a plurality of projections provided at radially spaced locations relative to a rotational axis of the impeller. The projections extend axially from a surface of the impeller and circumferentially about the rotational axis of the impeller. At least one of the projections is configured to be at least partially received, in use, in a recess provided in the housing such that a flow path is provided by the projection and the respective recess, wherein the flow path provides a tortuous flow route for fluid between an inlet and outlet of the pump assembly so as to restrict flow of fluid along said flow path and thereby minimise flow of fluid from the outlet back towards the inlet in a direction opposite to the intended direction of flow.

The invention minimises unwanted flow of coolant from the outlet of the housing back towards the inlet of the housing, thus improving efficiency of the system, in particular volumetric efficiency of the system. The flow path of the invention may also be described as a restrictive flow path or a high pressure drop route.

The impeller may comprise at least three projections. At least one of the projections may have a rectangular cross-section. At least one of the projections may have a triangular cross-section.

At least one of the projections may have a different cross-section from the or each of the other projections. At least one of the projections may have a different radial width or thickness from the or each of the other projections. At least one of the projections may have a different axial height relative to the surface of the impeller from which the projections axially extend from the or each of the other projections.

The axial height of the projections relative to the surface of the impeller from which the projections axially extend may decrease in a radially outward direction away from the rotational axis of the impeller. Alternatively, all of the projections may have the same axial height relative to the surface of the impeller from which the projections axially extend, or the projections may increase in height in a radially outward direction away from the rotational axis of the impeller.

Incorporating different shapes, sizes and configurations of the projections of the impeller may be beneficial to provide a more laborious and less direct route for the flow of coolant. It may be advantageous to provide the majority of the projections with a shape which is relatively easy and inexpensive to manufacture and fewer projections with a more complex shape which is more difficult to manufacture and or more costly, but which provides additional deviation in the flow path. In this way, a balance may be struck between ease of manufacture, cost and efficiency.

Furthermore, having different shaped and/or sized projections may aid in assembly of the impeller to the housing. For example, if one of the projections of the impeller defines a triangular cross section but the other projections define rectangular cross sections, then the triangular projection may serve to locate the impeller in the correct position with respect to the housing.

A minimum axial height of the plurality of projections away from a surface of the impeller may be 5 mm. In a particular embodiment, the minimum axial height is approximately 7 mm. It is generally preferable for the axial height of the projections to be as big as is practicable.

A radially innermost one of the projections may be defined by a wearing ring, wear ring or nose ring. Such a ring may also be referred to as a 'suction diameter'. Wearing rings are known in the art of centrifugal pumps and are arranged on the impeller to provide a running clearance between the impeller in the region of the wearing ring and the pump housing. Clearances between the impeller and the pump housing may increase over time due to erosion caused by fluid flowing through the pump. Wearing rings may be replaceable and erode in place of the impeller or pump housing and/or may provide a harder surface to reduce erosion. Replacing the wearing ring periodically throughout the life of the pump may be more cost effective than the maintenance that would be required if the pump was not provided with a wearing ring.

At least one of the projections may be provided with at least one minor recess to define a deviation within the flow path. Alternatively or additionally, at least one surface of the impeller located between adjacent projections may be provided with at least one minor recess to define a further deviation within the flow path.

In an aspect of the invention there is provided a pump assembly for a fluid circuit of an engine of a vehicle, the pump assembly comprising an impeller as defined in any of the preceding paragraphs, the pump assembly further comprising:

a. a housing;
b. an inlet for receiving fluid to the pump assembly; and
c. an outlet from which fluid exits the pump assembly;
d. wherein the plurality of projections of the impeller are located between the inlet and outlet of the pump assembly, wherein the housing is provided with a plurality of recesses, at least one of which is configured to at least partially receive a respective one of the projections of the impeller such that a flow path is provided by the recess and the respective projection, wherein the flow path provides a tortuous flow route for fluid between the inlet and the outlet so as to restrict flow of fluid along said flow path and thereby minimise flow of fluid from the outlet back towards the inlet in a direction opposite to the intended direction of flow.

At least two of the projections of the impeller may be received in at least two of the recesses of the housing.

In this way, the impeller of the invention generally needs less accurate alignment to the housing of the pump assembly, as the assembly is relatively insensitive to radial misalignment of the impeller rotational axis and the longitudinal axis of the inlet of the housing. This is because a change in spacing between one side of a projection of the impeller and the housing due to radial misalignment is compensated by a corresponding and opposite change in spacing between the opposing side of the projection and the housing. Thus, the sealing properties are less affected than in alternative designs including no or fewer corresponding projections to be received in the recesses of the housing.

At least one of the recesses in the housing may itself be provided with at least one secondary recess to define a further deviation within the tortuous flow path. Alternatively or additionally, at least one surface of the housing located between adjacent recesses may be provided with at least one secondary recess to define a further deviation within the flow path.

At least one minor recess of the impeller may be aligned with a secondary recess of the housing. At least one minor recess of the impeller may be offset from a secondary recess of the housing.

A minor recess herein described is a recess in the surface of the impeller. This may be a recess in the surface of a projection or a recess in the surface between projections. The minor recess provides a sudden local change in flow area in order to generate turbulence and therefore further restrict flow around the projections. In a similar manner, a secondary recess herein described is a recess in the surface of the housing. This may be a recess in the surface of a recess of the housing or the surface between recesses. This has a similar effect of creating turbulence to restrict flow. The minor recess and secondary recess may interact to further increase turbulence and further restrict flow.

The fluid may be a coolant. The housing may form a part of a cylinder block of an engine of a vehicle.

The pump assembly may comprise a centrifugal pump.

Another aspect of the invention provides a vehicle comprising a pump assembly as described in the preceding paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
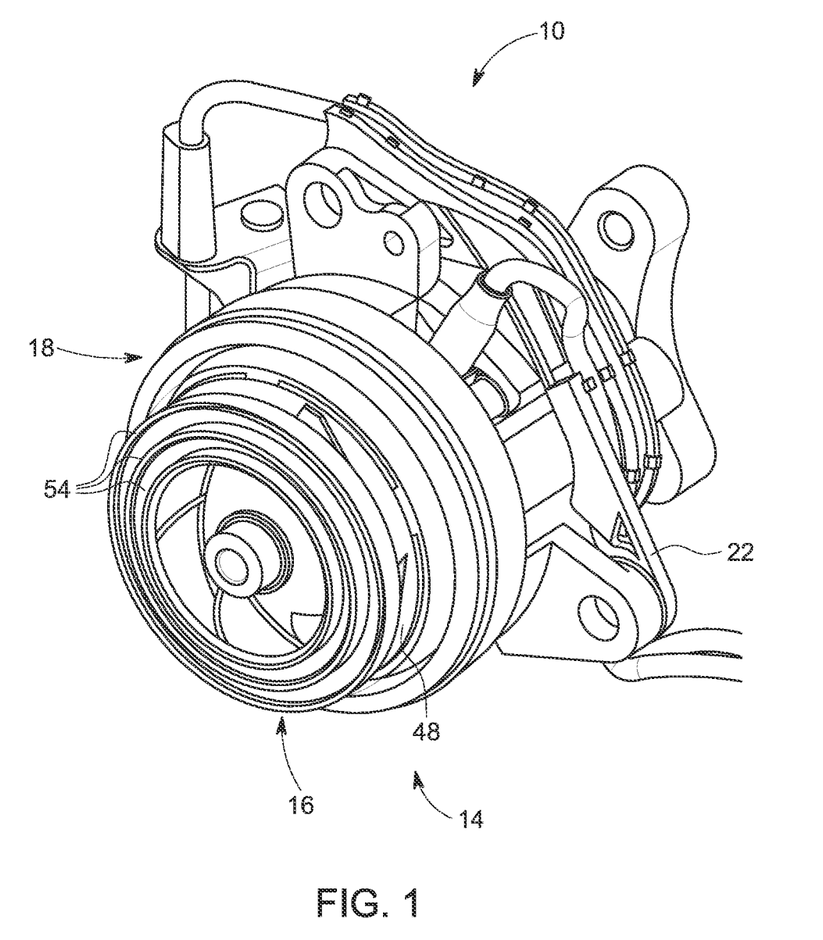
FIG. 1 is a perspective view of an impeller in accordance with an embodiment of the invention, and a portion of a housing of a pump assembly in which the impeller is implemented.
Figure 2:
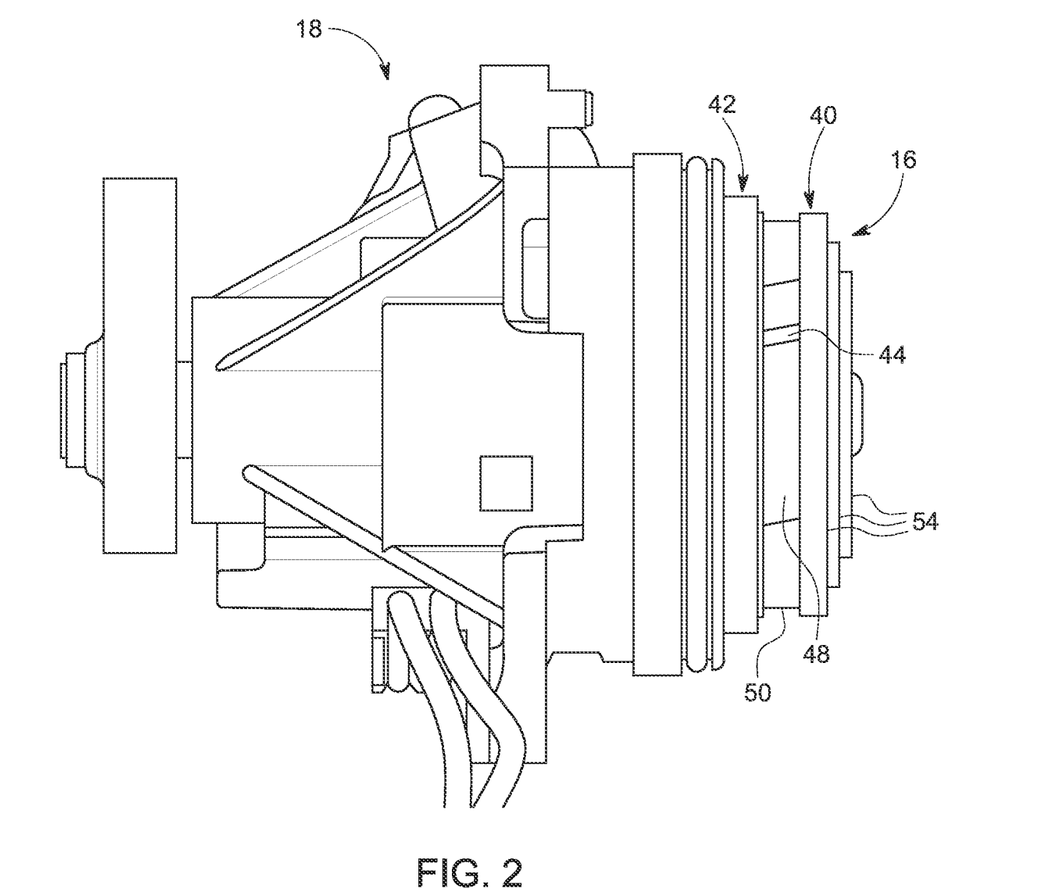
FIG. 2 is a side view of the impeller and housing portion illustrated in FIG. 1.
Figure 3:
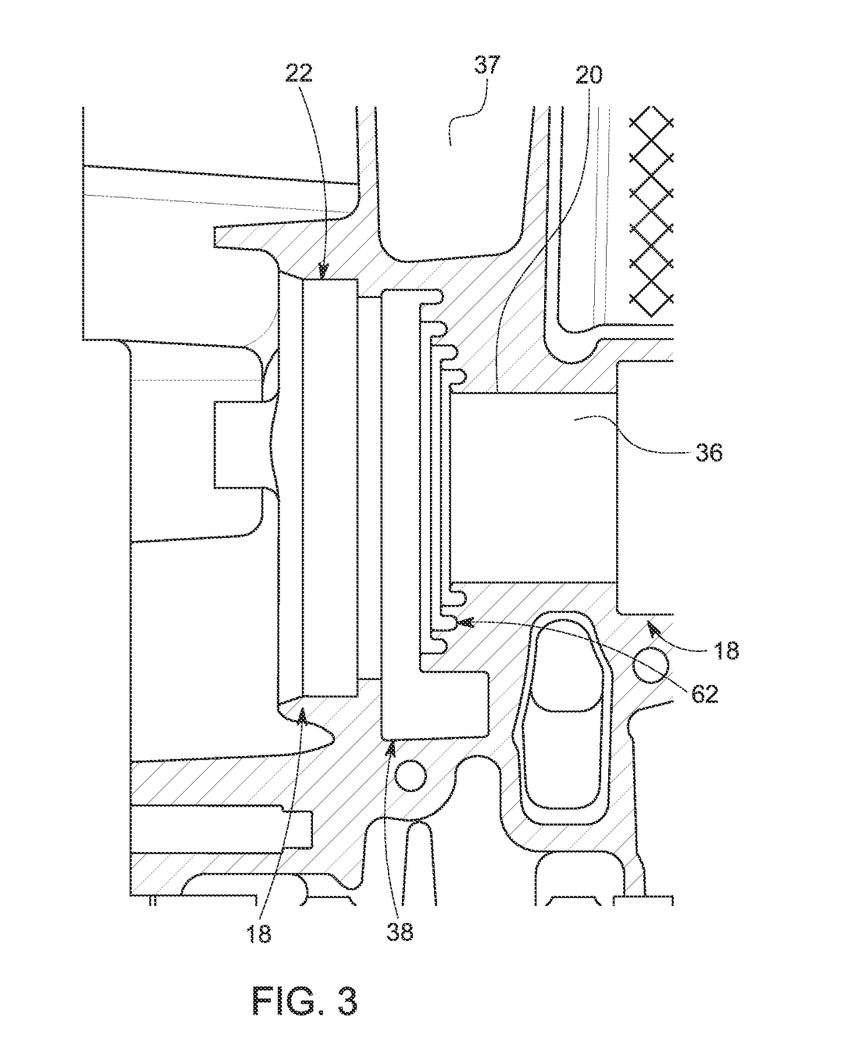
FIG. 3 is a side view of a portion of the housing of the pump assembly encasing the impeller of FIG. 1.

Referring to FIGS. 1 to 3, components of a pump assembly 10 for use in an engine cooling circuit of a vehicle are shown.

The pump assembly 10 is formed by a centrifugal pump 14 which circulates coolant in the form of water to components of an engine of the vehicle (not shown) for cooling.

The pump assembly 10 comprises an impeller 16 and a pump housing 18. The impeller 16 is disposed within the pump housing 18 and is rotatable relative to the housing 18 about a rotational axis. In use, the impeller 16 is driven to rotate, thereby pumping coolant received by the pump assembly 10 from a radiator of the vehicle (not shown) towards the engine of the vehicle to provide cooling.

The pump housing 18 includes a front portion 20 and a rear portion 22. The impeller 16 is housed in the front portion 20 of the housing 18 and is mounted at a first end 24 of a rotatable shaft 26. The shaft 26 is rotatably supported in the housing 18 by a bearing arrangement 28, and extends out of the housing 18 through an aperture 30 provided in the rear portion 22 of the housing 18. A drive member 32 is attached at a second end 34 of the shaft 26 located outside of the pump housing 18 and is coupled to a crankshaft of the engine (not shown) via a pulley or belt assembly (not shown). In use, the crankshaft drives rotation of the drive member 32 and impeller 16 about a rotational axis of the shaft 26 via the pulley or belt system. It should be noted that in other embodiments the pump assembly 10 may be driven by an electric motor, for example when the assembly 10 is included in a hybrid vehicle.

The front portion 20 of the housing 18 further includes an inlet or suction line 36 for receiving coolant to the pump assembly 10 and an outlet or discharge line, part of which is shown in FIG. 3 and indicated by numeral 37, from which coolant exits the pump assembly 10 and is directed to coolant passages of the engine (not shown).

Figure 4:
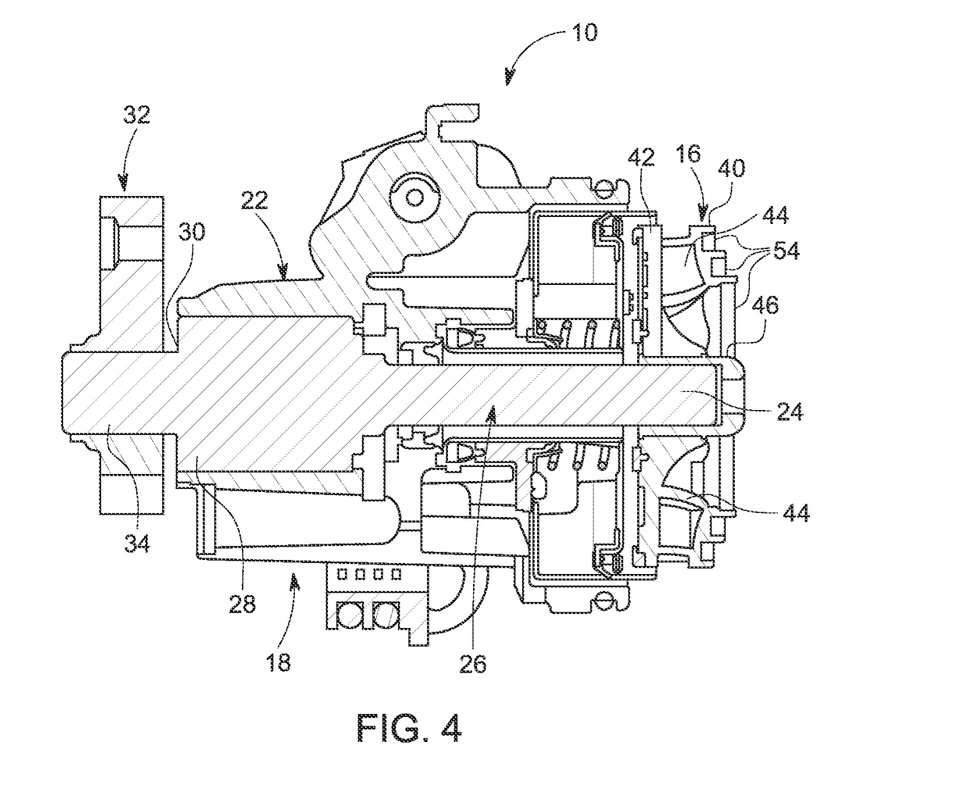
FIG. 4 is a cross section through the impeller and housing portion of FIG. 1.
Figure 5:
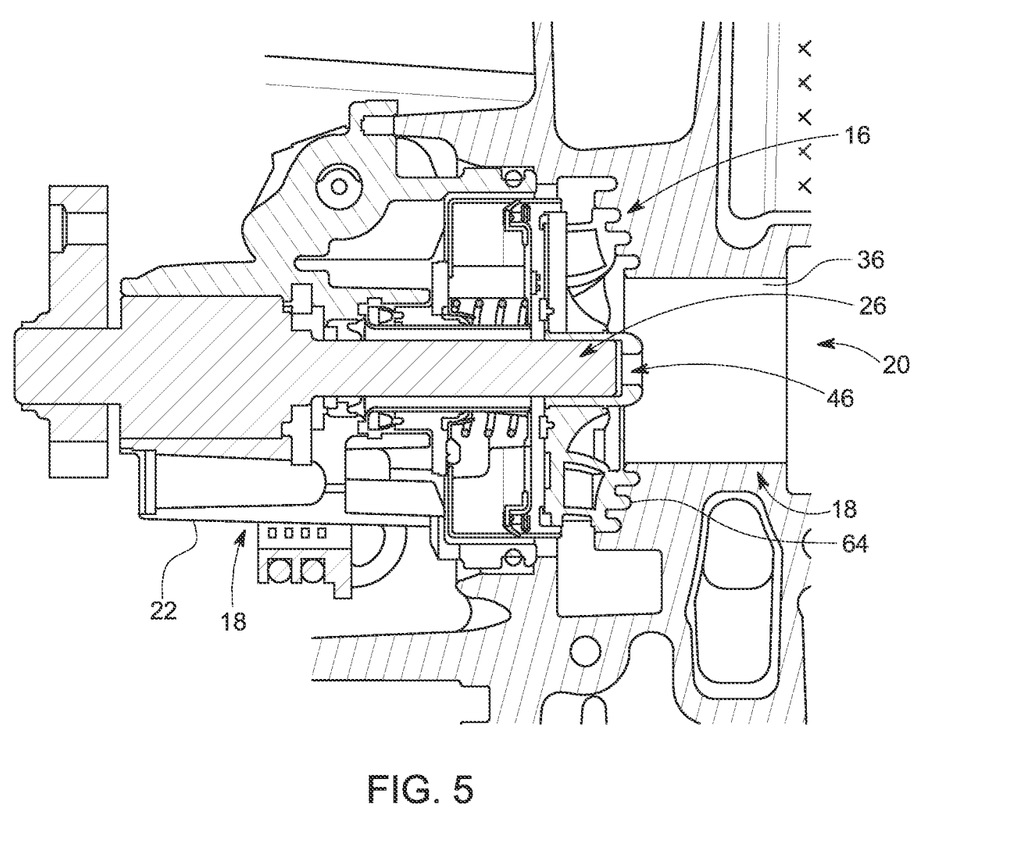
FIG. 5 is a cross section through the impeller and housing portion of FIG. 3.

The impeller 16 is best seen in FIGS. 1, 2 and 4. The impeller 16 includes a front shroud or plate 40, a back shroud or plate 42 and a plurality of blades 44 located therebetween. The front plate 40 slopes rearwardly away from the inlet 36 of the housing 18 and the back plate 42 is generally flat. It should be noted that in other embodiments the front and back plates, 40, 42, may be configured differently. A central aperture 46 is provided in the front plate 40 of the impeller 16 and this aperture 46 is aligned with the rotational axis of the shaft 26 and the inlet 36 of the pump housing 18. As best seen in FIG. 2, the impeller 16 further includes circumferential apertures 48 about an outer edge 50 of the impeller 16. The blades 44 of the impeller 16 are generally curved and extend from the central aperture 46 to the outer edge 50 of the impeller 16. In use, coolant enters the pump assembly 10 through the inlet 36 of the housing 18 and enters the rotating impeller 16 through the central aperture 46 of the front plate 40.

As the impeller 16 rotates, coolant is forced radially outwards from the centre of the impeller 16 towards the circumferential outlet apertures 48 of the impeller 16. From here, the coolant enters a volute 38 that surrounds the impeller 16 and is guided to the outlet 37 of the housing 18 and towards the engine for cooling. Thus, coolant is pumped from the inlet 36 of the pump assembly 10 to the outlet 37 of the pump assembly 10.

One issue that may arise in a pump assembly 10 relates to the unwanted flow of coolant along a route other than the intended flow path. For example, it is possible for coolant, on exiting the impeller 16, to flow back towards the inlet 36 of the housing via the space between the front plate 40 of the impeller 16 and the housing 18 in which the impeller 16 is encased. The effect of this is a reduction in efficiency of the pump assembly 10. As such, it is preferable to minimise flow of coolant along this flow path, i.e. along the route between the inlet 36 and the outlet 37 of the housing 18 that is not the main intended flow route of the coolant, and to maximise the proportion of the flow delivered through the outlet 37. One way of reducing unwanted flow of coolant from the outlet 37 of the housing 18 back towards the inlet 36 of the housing 18, and thus to improve efficiency of the system, is to provide the portion of the housing 18 that faces towards the front plate 40 of the impeller 16 with recesses to provide a labyrinth cover. Although this cover provides a seal, this design is not tolerant to radial misalignment. That is to say, misalignment between the longitudinal axis of the inlet and the rotational axis of the impeller affects the sealing properties in a design implementing such a labyrinth cover. The impeller 16 and pump assembly 10 of the invention provide improvement over this design, as will be explained. It is worthwhile noting here that whilst labyrinth seals have been implemented in steady state water pumps before, but have not before been utilised in automotive applications where different flow rates are required.

Figure 6:
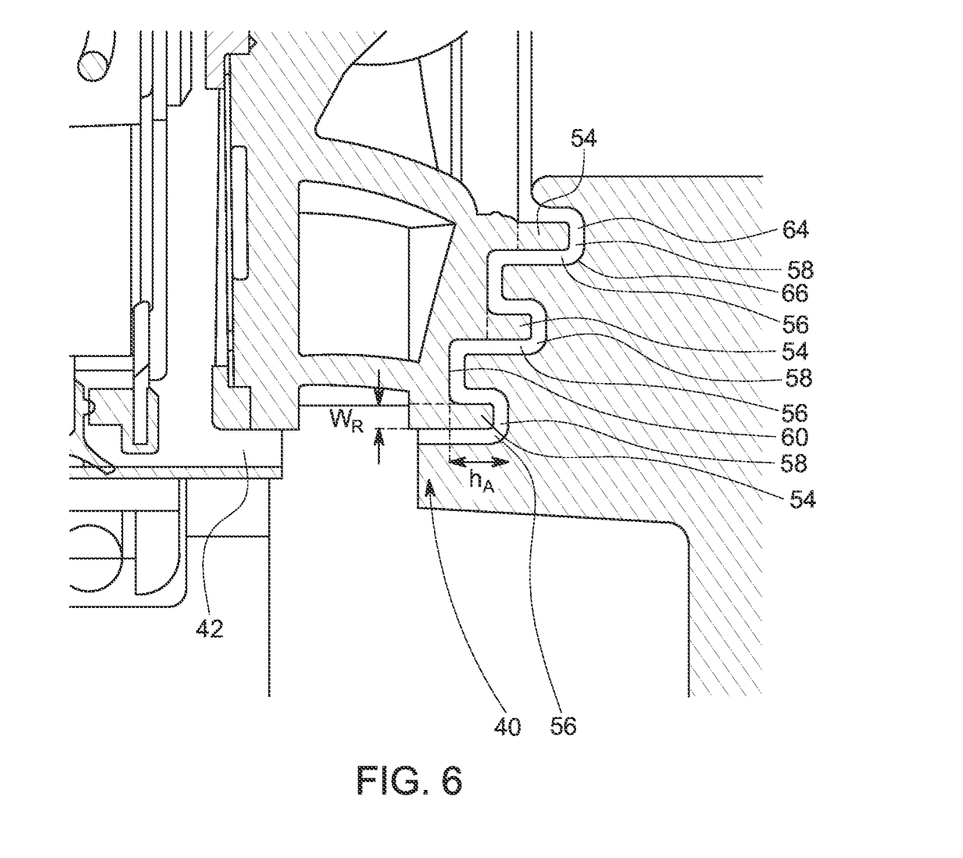
FIG. 6 shows an enlarged section of the view of FIG. 5, showing projections of the impeller received in corresponding recesses of the housing of the pump assembly.

Referring now to FIGS. 1 and 2 in particular, the impeller 16 is provided with a plurality of projections or protrusions 54, which are generally located between the inlet 36 and outlet 37 of the housing 18 when the pump assembly 10 is assembled. In use, as will be described below, one or more of the projections 54 are received in one or more corresponding recesses 56 of the housing 18 to define a tortuous flow path 58 between the parts 54, 56, from the outlet to the inlet, which it is indirect and meandering, and is therefore difficult for coolant to flow along. This flow route or path 58 is best seen in FIG. 6. Based on pressure drop, a greater flow rate in the pump results in a more effective labyrinth. This is particularly important for the efficiency of engines requiring high cooling flows.

In this embodiment, three projections 54 are provided on the impeller 16, although it is possible for more or fewer to be included. Providing a greater number of projections 54 on the impeller 16 may be beneficial in terms of providing a more circuitous flow route between the inlet 36 and outlet 37 of the housing 18, thereby further restricting flow of coolant along this path.

The projections 54 extend outwardly from an outer surface 60 of the front plate 40 of the impeller 16 in a direction parallel to the rotational axis of the impeller 16 and extend circumferentially about the rotational axis of the impeller 16. The projections 54 are radially spaced on the outer surface 60 of the front plate 40 so as to form a pattern of concentric rings, as is best seen in FIG. 1. In this embodiment the projections 54 are equally spaced from each other, but in other embodiments this may not be the case. Also, it is possible that in some embodiments a radially innermost projection is formed by a wearing ring or nose ring 100 as shown in FIG. 8.

Referring now to FIGS. 4 and 6, each of the projections 54 is rectangular in cross-section in this embodiment of the invention. The radial width, $w_R$, of each projection 54 is identical and has a value of 3.4 mm. The axial height, $h_A$, of each of the projections 54 (defined as the absolute extent that each projection 54 protrudes away from the outer surface 60 of the front plate 40 of the impeller 16), is also identical in this embodiment and has a value of 4.5 mm. It should be noted that the present embodiment shows only one possible example of the size and shape of the projections 54, but that many other sizes and shapes are possible within the inventive concept. For example, the axial height, $h_A$, and/or radial width, $w_R$, of one or more of the projections 54 could be smaller or larger in other embodiments of the invention. Furthermore, the general shape of one or more of the projections 54 could be different in other embodiments. An example of another possible shape that the projections 54 could take is triangular, i.e. giving rise to a triangular cross-section. It should also be noted that it is not required for all of the projections 54 to have the same size and shape, but that it would be possible for one or more of the projections 54 to be shaped and/or sized differently to the other projections.

Figure 8:
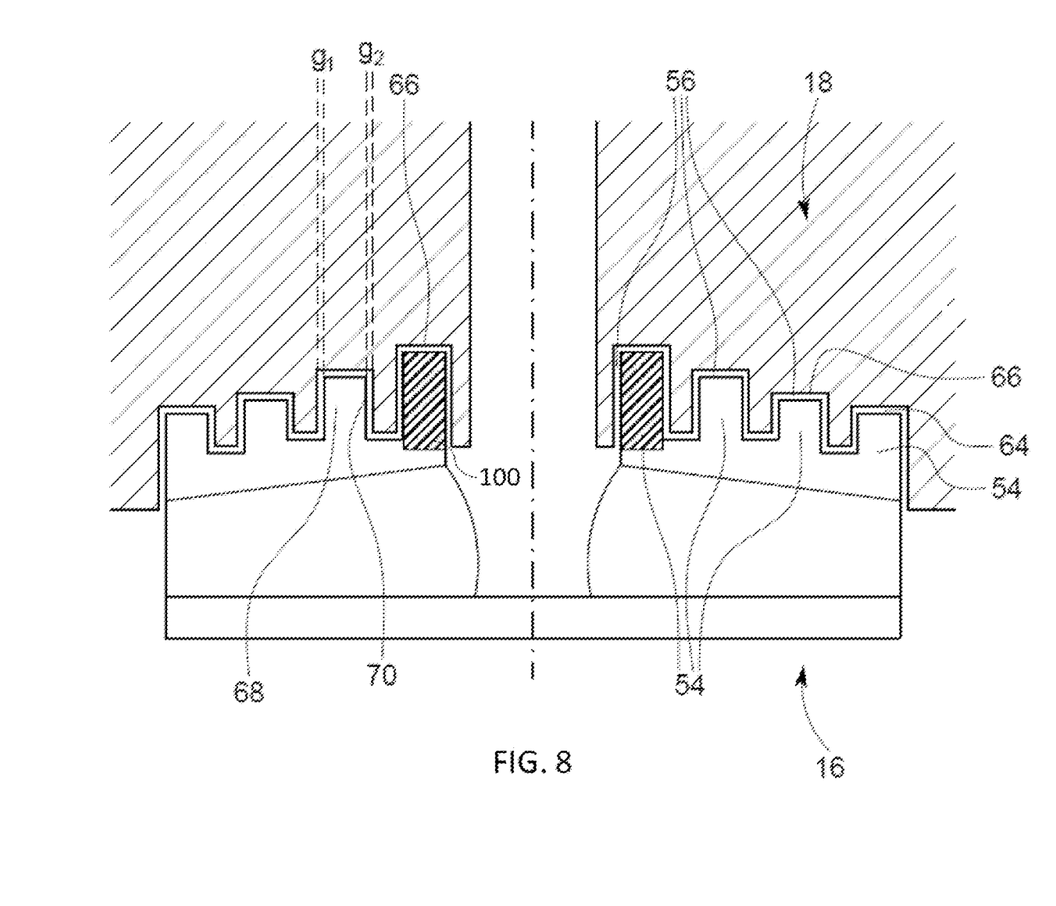
FIG. 8 is a schematic representation showing projections of the impeller including one of the projections comprising a wear ring.
Figure 9:
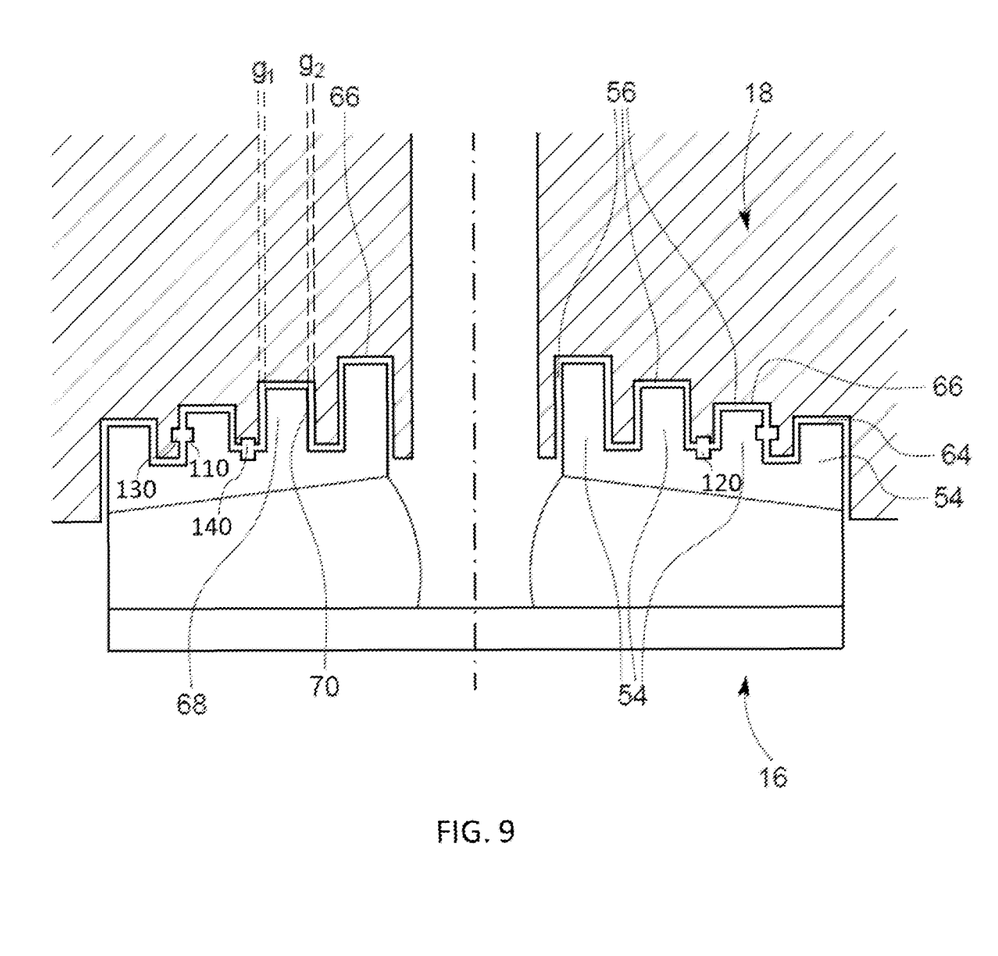
FIG. 9 is a schematic representation showing projections of the impeller received in corresponding recesses of the housing of the pump assembly including a recess formed in at least one projection and a corresponding recess of the housing.
Figure 10:
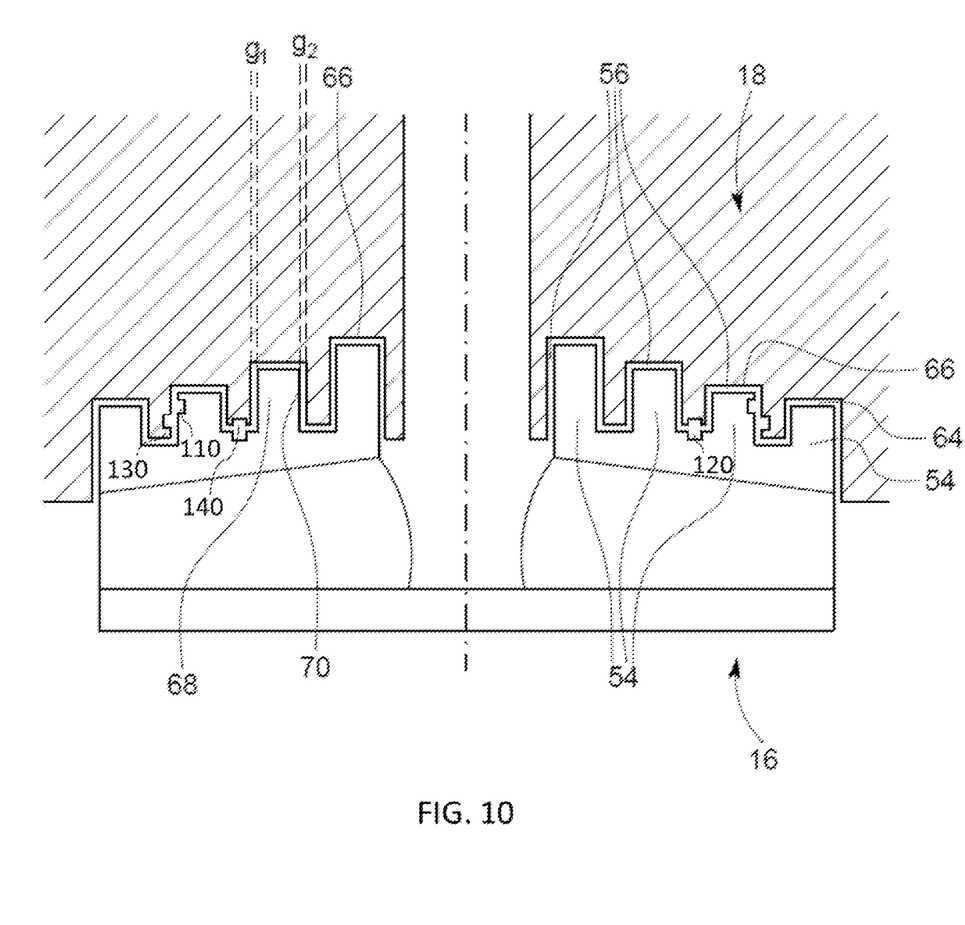
FIG. 10 is a schematic representation showing projections of the impeller received in corresponding recesses of the housing including a recess formed in at least one of the projections and a recess in a corresponding recess of the housing that is not directly aligned with the recess in the projection.

For example, FIGS. 8-10 show projections having different axial heights. The radially most inward projection 56 has a larger axial height compared to others of the projections 56. FIG. 1 also shows a difference between the projections 56. The radially most inward of the projections shown in FIG. 1 has a smaller radial width than the other projections shown there.

Incorporating different shapes, sizes and configurations of the projections 54 may be beneficial to provide a more laborious and indirect route for the flow of coolant. It may be advantageous to provide the majority of the projections 54 with a shape which is relatively easy and inexpensive to manufacture and fewer projections 54 with a more complex shape which is more difficult to manufacture and/or more costly, but which provides additional deviation in the flow path. In this way, a balance may be struck between ease of manufacture, cost and efficiency of performance.

Furthermore, having different shaped and/or sized projections 54 may aid in assembly of the impeller 16 to the housing 18. For example, if one of the projections 54 of the impeller 16 defines a triangular cross section but the other projections 54 define rectangular cross sections, it may be helpful for the triangular projection to serve as a locating feature to locate the impeller 16 in the correct position with respect to the housing 18.

As noted already, the projections 54 of the impeller 16 are at least partially received in corresponding recesses 56 of the front portion 20 of the pump assembly housing 18. With reference to FIG. 3, this shows a front section of the pump assembly 10 in which the front portion 20 of the housing 18 encasing the impeller 16 can be seen. The inlet 36 of the housing 18 is generally aligned with both the central aperture 46 of the impeller 16 and with the rotational axis of the impeller 16, and transitions to a cover portion 62 that covers the front plate 40 of the impeller 16. The cover portion 62 is dimensioned so as to substantially match the size and shape of the front plate 40 of the impeller 16, but with a small clearance gap 64 provided therebetween to allow for rotation of the impeller 16 with respect to the housing 18. The outlet 37 of the housing 18 is arranged at the circumference of the impeller 16.

This clearance space or gap 64 between the impeller and housing defines the tortuous and difficult flow route 58 for the coolant, as discussed earlier, thereby inhibiting or restricting flow of coolant from the outlet 37 of the housing 18 back towards the inlet 36. That is to say, corresponding ones of the projections 54 and recesses 56 together inhibit coolant exiting the impeller 16 from flowing back towards the inlet 36 of the housing 18 in a direction which is against the intended direction of flow. In this way, the corresponding projections 54 and recesses 56 provide a labyrinth-type seal.

Figure 7:
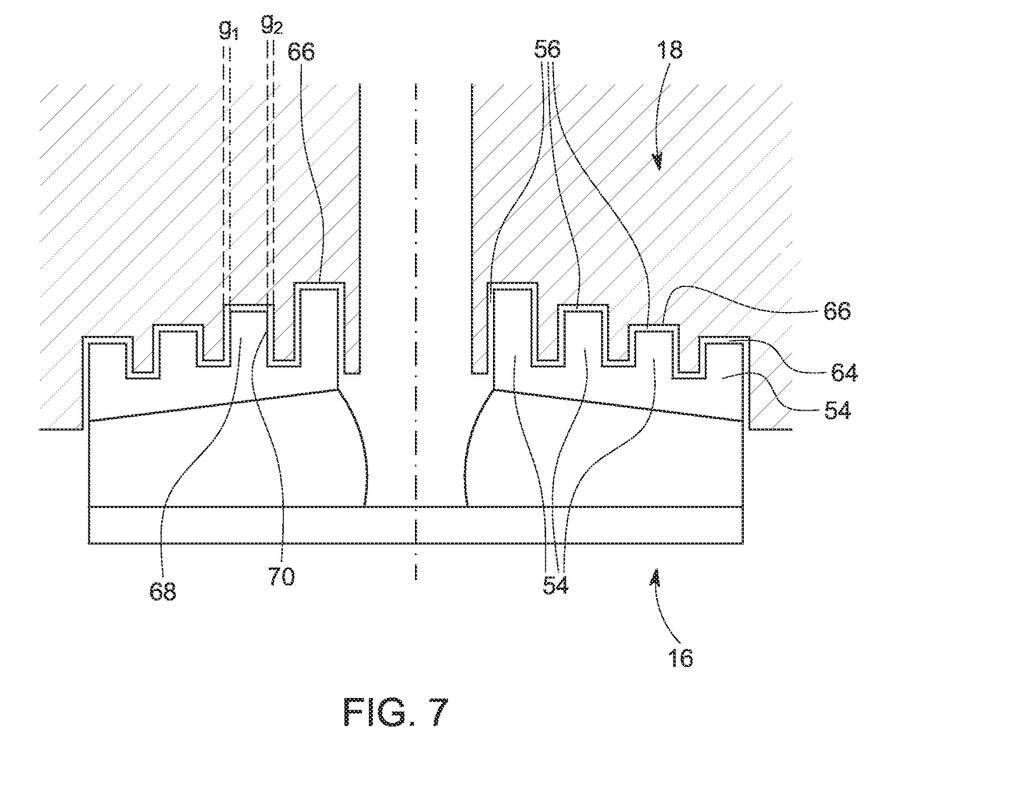
FIG. 7 is a schematic representation showing projections of the impeller received in corresponding recesses of the housing of the pump assembly.

Referring now to FIGS. 6 and 7, the recesses 56 are formed in an inner surface 66 of the housing 18 and are dimensioned so as to receive the corresponding projections 54 with the clearance gap 64 therebetween. In this embodiment, the housing 18 comprises three recesses 56 of identical size and shape, said recesses 56 being rectangular in cross-section and each receiving at least a portion of a corresponding projection 54 of the impeller 16.

In use, coolant enters the pump assembly 10 from the inlet 36 of the housing 18 and passes through the central aperture 46 of the front plate 40 and into the impeller 16. The impeller 16 rotates about the rotational axis of the shaft 26 on which it is mounted and coolant is expelled from the center of the impeller 16 towards the outer edge 50 of the impeller 16. Coolant passes out of the impeller 16 through the circumferential apertures 48 and exits the pump assembly 10 from the outlet 37 of the housing 18 via the volute 38. Coolant is then directed to the engine for cooling.

As discussed above, the gap 64 is provided between the front plate 40 of the impeller 16 and the cover portion 62 of the housing 18. Once coolant has exited the impeller 16, it is possible for coolant to flow back towards the inlet 36 via this clearance gap 64, rather than out of the outlet 37 of the housing 18 as intended. By virtue of the corresponding projections 54 and recesses 56 of the impeller 16 and housing 18 respectively, this unwanted back-flow towards the inlet 36 is reduced. Furthermore, the inclusion of projections 54 to engage with each of the recesses 56 provided in the housing 18 results in a greater tolerance to radial misalignment of the rotational axis of the impeller 16 (corresponding to the rotational axis of the shaft 26) and the longitudinal axis of the housing inlet 36. With reference to FIG. 7, this is because an increase in clearance gap between a first side 68 of a projection 54 and the inner surface 66 of the housing 18, $g_1$, is compensated by a decrease in clearance gap between a second opposing side 70 of the projection 54 and the inner surface 66 of the housing 18, $g_2$. In this way, the effect of radial misalignment on the sealing properties provided by the corresponding projections 54 and recesses 56 is reduced. In a similar way to that described above in respect of radial misalignment, the effect of angular misalignment of the rotational axis of the impeller 16 and the longitudinal axis of the housing inlet 36 is reduced by the corresponding projections 54 and recesses 56 of the present invention. That is to say, an increase in clearance gap between the first side 68 of a projection 54 and the inner surface 66 of the housing 18, at a given position along the length of the projection 54, is compensated by a decrease in clearance gap between the second opposing side 70 of the projection 54 and the inner surface 66 of the housing 18 at the same given position along the length of the projection 54. The pump assembly 10 of the invention therefore generally needs less accurate alignment than necessary in previous designs.

Furthermore, the invention provides more stable efficiency of operation of the pump assembly 10 from low pump rates to high pump rates, resulting in a flatter operating curve. As such, the invention results in improved conformity of production, such that variations in efficiency between different pump assemblies 10 produced according to the invention are reduced. This is compared to pump assembly designs using, for example, a labyrinth cover as discussed earlier, in which the peak efficiency may by slightly higher at moderate or average pump rates, but the efficiency falls off rapidly away from this pump rate towards higher or lower rates. Furthermore, the efficiency of these labyrinth cover systems falls off more rapidly in the event of misalignment of the impeller and housing (i.e. radial and angular misalignment of axes of the impeller and housing as described above) than in the system of the present invention. Thus, the invention is especially advantageous when utilized in larger, more powerful vehicles requiring a greater flow rate of coolant, in which the pump 10 may be operated at relatively higher pump rates as standard.

In other embodiments of the invention it is possible to provide further deviation to the flow path 58 of the coolant defined by the projections 54 of the impeller 16 and the recesses 56 of the housing 18 by including further recesses on the impeller 16 and/or housing 18. In this way, the coolant flow path 58 is further disrupted, resulting in an even more difficult route for coolant to traverse along the flow path 58.

For example, in embodiments of the invention as shown in FIGS. 9 and 10, a surface of at least one of the projections 54 of the impeller 16, or a surface of the impeller 16 between adjacent projections 54, may be provided with at least one minor recess 110, 120. Correspondingly, one or more secondary recesses 130, 140 may be provided in a surface of at least one of the recesses 56 of the housing 18, or in a surface of the housing 18 located between adjacent recesses 56 of the housing 18. In embodiments including at least one minor recess of the impeller 16 and at least one secondary recess of the housing 18, it is possible for said recesses to be aligned with one another as shown in FIG. 9 or to be offset from one another as shown in FIG. 10.

It is to be appreciated that many modifications may be made to the above examples and embodiments without departing from the scope of the present invention as defined in the accompanying claims.

The invention claimed is:

1. A pump assembly for a liquid circuit of an engine of a vehicle, comprising:
 an impeller; and
 a housing, the impeller being rotatable relative to the housing, and the impeller comprising a plurality of projections provided at radially spaced locations relative to a rotational axis of the impeller, the projections extending axially from a surface of the impeller and circumferentially about the rotational axis of the impeller,
 wherein at least one of the projections is configured to be at least partially received in a recess provided in the housing such that a flow path is provided by the projection and the recess, wherein the flow path provides a tortuous flow route for fluid between an inlet and outlet of the pump assembly so as to restrict flow of fluid along said flow path and thereby minimize flow of fluid from the outlet back toward the inlet in a direction opposite to an intended direction of flow,
 wherein the housing forms a part of a cylinder block or a cylinder head of an engine of the vehicle.

2. The pump assembly as claimed in claim 1, wherein the impeller comprises at least three projections.

3. The pump assembly as claimed in claim 1, wherein at least one of the projections has a rectangular cross-section.

4. The pump assembly as claimed in claim 1, wherein at least one of the projections has a triangular cross-section.

5. The pump assembly as claimed in claim 1, wherein at least one of the projections has a different cross-section from at least one other of the projections.

6. The pump assembly as claimed in claim 1, wherein at least one of the projections has a different radial width from at least one other of the projections.

7. The pump assembly as claimed in claim 1, wherein at least one of the projections has a different axial height relative to the surface of the impeller than at least one other of the projections.

8. The pump assembly as claimed in claim 7, wherein the axial height relative to the surface of the impeller decreases in a radially outward direction away from the rotational axis of the impeller.

9. The pump assembly as claimed in claim 1, wherein all of the projections have an axial height relative to the surface of the impeller that is the same.

10. The pump assembly as claimed in claim 1, wherein a radially innermost one of the projections comprises a wearing ring.

11. The pump assembly as claimed in claim 1, wherein at least one of the projections is provided with at least one recess to define a deviation within the flow path.

12. The pump assembly as claimed in claim 1, wherein at least one surface of the impeller located between adjacent projections is provided with at least one recess to define a deviation within the flow path.

13. A pump assembly as claimed in claim 1, wherein at least two of the projections of the impeller are received in at least two of the recesses.

14. A pump assembly as claimed in claim 1, wherein at least one of the recesses in the housing is provided with at least one recess to define a deviation within the flow path.

15. The pump assembly as claimed in claim 1, wherein at least one surface of the housing located between adjacent recesses is provided with at least one recess to define a deviation within the flow path.

16. The pump assembly as claimed in claim 1, wherein
 at least one of the projections is provided with at least one recess to define a deviation within the flow path; and
 the at least one recess that defines the deviation within the flow path is aligned with a recess of the housing.

17. The pump assembly as claimed in claim 1, wherein
 at least one of the projections is provided with at least one recess to define a deviation within the flow path; and
 the at least one recess that defines the deviation within the flow path is offset from a secondary recess of the housing.

18. A vehicle comprising the pump assembly of claim 1.

* * * * *